US005753348A

United States Patent [19]

Hatakeyama et al.

[11] Patent Number: 5,753,348

[45] Date of Patent: May 19, 1998

[54] FLUORORESIN TUBE-COVERED FIXING ROLLER, AND IMAGE FORMATION APPARATUS

[75] Inventors: Hideyuki Hatakeyama, Yokohama; Hiroaki Kumagai; Kazuo Kishino, both of Kawasaki; Masaaki Takahashi, Asaka; Hideo Kawamoto, Kawasaki, all of Japan

[73] Assignee: Canon Kabushiki Kaisha, Tokyo, Japan

[21] Appl. No.: 654,609

[22] Filed: May 29, 1996

[30] Foreign Application Priority Data

May 31, 1995 [JP] Japan .................................... 7-133809

[51] Int. Cl.$^6$ ........................................................ B32B 3/00

[52] U.S. Cl. .......................... 428/195; 428/212; 428/213; 428/35.7; 428/421; 492/30; 492/31; 492/35; 492/46; 492/56; 399/122; 399/320; 399/324; 399/328

[58] Field of Search .................................... 428/195, 212, 428/213, 35.7, 421; 492/30, 31, 35, 46, 56; 399/122, 320, 324, 328

[56] References Cited

U.S. PATENT DOCUMENTS

| | | | |
|---|---|---|---|
| 4,363,862 | 12/1982 | Giorgini | 430/98 |
| 5,319,427 | 6/1994 | Sakurai et al. | 355/285 |
| 5,420,679 | 5/1995 | Goto et al. | 355/285 |
| 5,471,288 | 11/1995 | Ohtsuka et al. | 355/285 |

*Primary Examiner*—Mark Chapman

*Attorney, Agent, or Firm*—Fitzpatrick, Cella, Harper & Scinto

[57] ABSTRACT

A fixing roller for thermally fixing an unfixed toner image is comprised of a core cylinder and a fluororesin tube fused on the core cylinder. The core cylinder is provided on its periphery with a minute groove means. On fusing the fluororesin tube on the core cylinder, the minute groove means gives to the surface of the fluororesin tube convexities or concavities extending in parallel in the peripheral direction of the fixing roller.

13 Claims, 2 Drawing Sheets

FLUORORESIN TUBE-COVERED FIXING ROLLER, AND IMAGE FORMATION APPARATUS

BACKGROUND OF THE INVENTION

1. Filed of the Invention

The present invention relates to a fixing roller which can be utilized in the field of an image formation apparatus in an electrophotographic apparatus or an electrostatic recorder and which can be used in fixing a recording medium having an unfixed toner held and carried between the fixing roller and a press member, and it also relates to an image formation apparatus using the fixing roller.

2. Related Background Art

Heretofore, as the fixing means of an image formation apparatus, there has been used a heat roll system equipped with a fixing roller and a pressure roller which comes in contact with the fixing roller under pressure and which rotates following the same.

FIG. 1 shows one embodiment of such a fixing means.

The fixing means shown in FIG. 1 thermally presses and fixes an unfixed toner image as an unfixed development image on the surface of a transfer material P as a recording medium by a thermofixing roller 11 and a pressure roller 12.

The fixing roller 11 arranged on the upper side in FIG. 1 can be manufactured by covering the peripheral surface of a hollow core cylinder of aluminum, iron or the like with a material having good mold release characteristics such as a fluororesin. As the fluororesin-covered fixing roller, there can be particularly preferably used a fixing roller manufactured by covering a core cylinder whose surface is treated with alumite, with a tube made of a fluororesin such as PTFE (polytetrafluoroethylene), PFA (a copolymer of polytetrafluoroethylene and perfluoroalkyl vinyl ether), a mixture of PTFE and PFA, or FEP (a copolymer of tetrafluoroethylene and hexafluoropropylene), or a fixing roller manufactured by coating the core cylinder with a fluororesin primer, and then covering the coated core cylinder with the fluororesin tube. In the hollow space of the core cylinder, a heater 13 such as a halogen lamp is disposed, and the fixing roller 11 is heated by this heater.

The pressure roller 12 arranged on the lower side in FIG. 1 can be manufactured by covering the peripheral surface of a core cylinder of iron, stainless steel, aluminum or the like with an elastic layer such as silicone rubber and fluororubber or a foamed material such as silicone rubber. In addition, there can be used a pressure roller manufactured by coating the elastic layer or the foamed material with a material having good toner release characteristics such as the fluororesin, or a pressure roller manufactured by covering the elastic layer or the foamed material with a tube having the good toner release characteristics such as a fluororesin tube.

The fixing roller 11 and the pressure roller 12 come in contact with each other under a predetermined pressure by a press means such as a spring (not shown), and they are also rotated and driven in the direction shown by arrows.

Reference number 14 denotes a temperature sensitive element such as a thermistor in contact with the surface of the fixing roller 11, and it detects the surface temperature of the fixing roller 11. In accordance with the temperature detected by this temperature sensitive element 14, the feed of electric current to a heater 13 is controlled by a temperature adjusting circuit, so that the surface temperature of the fixing roller 11 can be automatically controlled to a fixing temperature which has been set to a predetermined value.

Reference number 17 denotes the metallic bottom plate of a fixing device, reference numbers 18 and 19 are an inlet guide and an outlet guide for a transfer material, respectively, and they are attached to and supported by the front wall and the rear wall of the bottom plate 17, respectively.

A transfer-receiving material P, on which a toner image is transferred from the surface of a drum as an image carrier by a transfer device as a transfer means (not shown), is carried to the fixing means, forwarded into the fixing device 1 through the entrance guide 18, and then passed through a portion nipped by the fixing roller 11 and the pressure roller 12 which are brought into contact with each other and which are rotatively driven.

During the passage of the transfer-receiving material (or paper) through this nipped portion, an unfixed toner image ta on the surface of the transfer material P is thermally fixed on the transfer-receiving material P as a permanent fixed image tb by the heat of the fixing roller 11 and the pressure applied by the fixing roller 11 and the pressure roller 12.

The transfer-receiving paper P on which the image has been fixed is ejected to an ejecting tray (not shown) through the outlet guide 19.

However, the above-mentioned conventional thermal fixing device has a problem that peeling offset occurs owing to a charging phenomenon of the fixing roller.

The peeling offset is a toner offset phenomenon, which is caused owing to peeling charges left in an axial direction on the surface of the fixing roller after the rear end of the transfer-receiving material has been separated from the fixing roller.

The peeling charges left in the axial direction of the fixing roller 11 act on the unfixed toner on the transfer-receiving material P, and the unfixed toner is transferred onto the fixing roller, so that a linear void phenomenon occurs on the image. Furthermore, the toner stuck on the fixing roller is transferred onto a transfer-receiving paper, so that image defective such as a double copy phenomenon takes place.

When the sheets of paper are continuously fed, plural streaks appear in the longitudinal direction of the fixing roller owing to the peeling charges, and the peeling offset phenomenon more noticeably occurs.

According to tests by the present inventors, the peeling offset can be prevented by removing the charges left on the surface of the fixing roller and reducing the charging on the surface of the fixing roller.

As a technique of removing the remaining charges, there is a method of bringing a tool having a discharge effect such as a discharge brush into contact with the fixing roller to remove the remaining charges therefrom. However, if such a method is used, there is such a drawback that the remaining charges cannot be completely removed, and further, the surface of the fixing roller is inconveniently worn by the discharge brush or the like.

As a technique of reducing the charging on the surface of the fixing roller, it may be contrived to make the surface fluororesin conductive. However, when the surface fluororesin is made conductive, the charging on the surface of the fixing roller may be controlled to a low level, but on the other hand, there is a problem that the charges applied to the transfer-receiving material in a transfer process leak outwardly via the fixing roller, so that the transfer material loses the force to hold the toner, resulting in the offset phenomenon.

Furthermore, if the so-called fluororesin-coated fixing roller is used in which a fixing roller surface fluororesin comprises a coating material such as a fluororesin powder coating material, a fluororesin dispersion or a fluororesin enamel, the charging on the surface of the fixing roller can be considerably reduced by minute pinholes in the surface coated with the fluororesin.

However, such a method is insufficient to completely eliminate the peeling offset, and the durability of the coating film is also poor. For these reasons, the method is impractical for use in a high-speed image formation apparatus.

On the other hand, in a case where the fluororesin tube is used on the surface of the fixing roller, there is no problem of durability, but any technique for preventing the peeling offset has not been found so far.

SUMMARY OF THE INVENTION

An object of the present invention is to provide an excellent fixing roller and an image formation apparatus which do not have the above-mentioned problems and which can prevent the peeling offset.

The present invention is directed to a fluororesin tube-covered fixing roller for thermally fixing an unfixed toner image, wherein a core cylinder of the fixing roller is provided on its periphery with a minute groove means for imparting to the surface of the fluororesin tube concavities or convexities extending in parallel in the peripheral direction of the fixing roller.

The present invention is also directed to an image formation apparatus for holding and carrying a recording medium having an unfixed toner by a fluororesin tube-covered fixing roller and a pressure member, and then fixing an unfixed image, said fluororesin tube-covered fixing roller being the above-mentioned fluororesin tube-covered fixing roller.

According to the present invention, a minute groove means is formed on the peripheral surface of the aluminum core cylinder or the iron core cylinder of the fixing roller in order to prevent the peeling offset in the fluororesin tube-covered fixing roller. The minute groove means may be comprised of a large number of circular minute grooves arranged in parallel in the direction of the fixing roller, or it may be in the form of a minute groove spirally wound closely around the fixing roller periphery.

When the above-mentioned core cylinder is covered with the fluororesin tube, convexities or concavities corresponding to the minute grooves appear on the surface of the fluororesin tube.

The separation of the transfer material from the fixing roller can be smoothly carried out by the effect of the minute grooves (or the convexities or concavities) on the surface of this fluororesin tube, so that the quantity of peeling charges can be reduced. In addition, the surface area of the fluororesin tube extremely increases, which can contribute to making small a potential difference due to the peeling charges. In consequence, the peeling offset can be prevented.

PREFERRED EMBODIMENTS OF THE INVENTION

Figure 1:
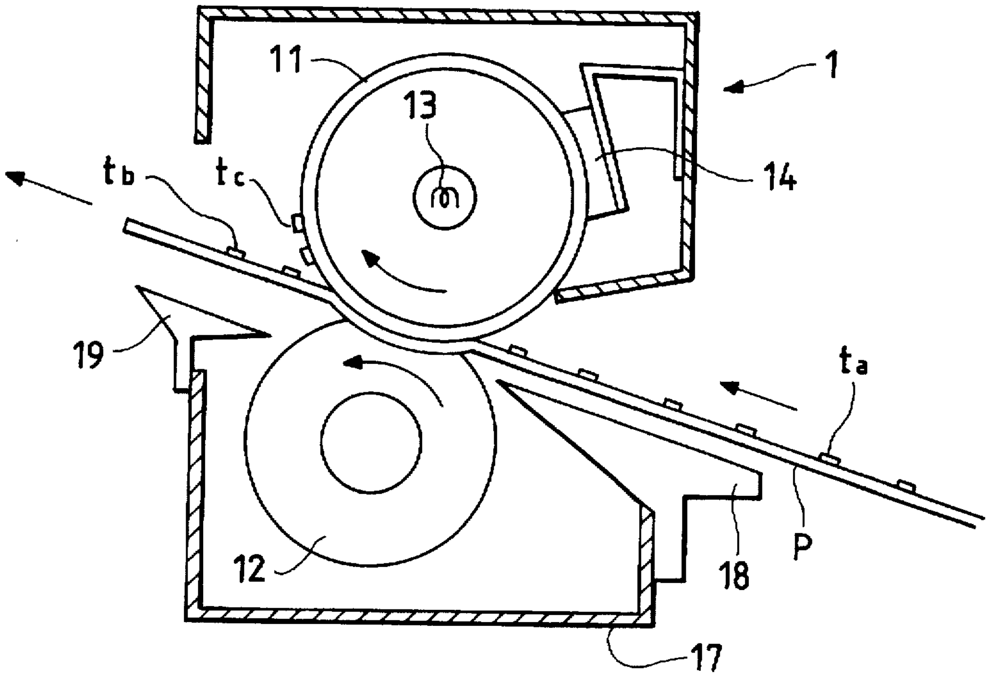
FIG. 1 is a schematic view of a conventional fixing device.

On the peripheral surface of a core cylinder, grooves extending in the peripheral direction of the core cylinder are formed in parallel. If the grooves are formed so as to cross each other, air bubbles are embraced between the core cylinder and a fluororesin tube at the intersections. These air bubbles are expanded by heat at the time of fixing to form irregularities on the surface of a fixing roller, so that a toner image is disturbed. In this connection, if the core cylinder is covered with the fluororesin tube under reduced pressure, such a problem does not occur.

The depth of the grooves formed on the core cylinder of the fixing roller is desirably in the range of from 3 to 15 μm. If the depth of the grooves is 2 μm or less, they are too shallow, so that when the core cylinder is covered with the fluororesin tube, the minute grooves cannot appear on the surface of the tube, and the effect of preventing the peeling offset decreases.

If the depth of the grooves is 16 μm or more, the peeling offset can be prevented, but the grooves are too deep, so that when the core cylinder is covered with the fluororesin tube, large convex lines appear on the surface of the fluororesin tube, and there is a tendency that when a paper having a solid black image is fed, undesirable lines appear along the convex lines on the tube surface.

A pitch between the grooves formed on the core cylinder of the fixing roller is suitably in the range of 81 to 250 μm. If the pitch between the grooves is 80 μm or less, the air bubbles left in the grooves are not completely expelled outwardly when the core cylinder is covered with the fluororesin tube, so that the air bubbles are often left between the core cylinder and the fluororesin tube. The fixing roller containing the air bubbles is impractical.

If the pitch between the grooves is 251 μm or more, the pitch between the convex lines which appear on the surface of the fixing roller increases, when the core cylinder is covered with the fluororesin tube. In consequence, the separation of the transfer material from the fixing roller cannot be smoothly carried out, and in addition, the surface area of the fixing roller decreases, so that a peeling charge potential cannot be reduced any longer, exhibiting poor effect of preventing the peeling offset is poor.

In the fluororesin-covered fixing roller into which the above-mentioned techniques are introduced, as a technique for adhering the fluororesin tube to the core cylinder of the fixing roller, there can be used a method which comprises subjecting the surface of the core cylinder to an alumite treatment, and then fusing the fluororesin tube on the thus treated core cylinder, and a method which comprises applying a fluororesin primer onto the core cylinder, and then fusing the fluororesin tube on the thus applied core cylinder.

The fluororesin primer referred to herein is a mixture of a binder component having adhesive properties to the core cylinder (e.g., polyamide imide, polyimide, polyphenylene sulfide or an epoxy compound) and a fluororesin component having adhesive properties to the fluororesin tube (e.g., PTFE, PFA or FEP).

No particular restriction is put on the volume resistance of the fluororesin primer, but it is suitably in the range of $1\times10^{3}$ to $1\times10^{10}$ $\Omega/cm^{2}$. As a technique for reducing the resistance of the fluororesin primer, there can usually be used a method which comprises dispersing a conductive filler such as carbon or a metal oxide in the primer.

As a technique for reducing the peeling charge potential on the surface of the fixing roller, it is effective to form the continuous and adjacent grooves in the peripheral direction of the core cylinder so as to form the minute grooves on the surface of the tube, as described above. In addition, it is also effective to increase the electrostatic capacity of the resin layer of the fixing roller. When the electrostatic capacity of the resin layer of the fixing roller is increased, the potential of the surface of the fixing roller can be reduced, even if the peeling charges are generated.

In an apparatus such as a high speed image formation apparatus in which the transfer-receiving paper is frequently peeled from the fixing roller, it is not easy to completely inhibit the generation of the peeling charges, even if the minute grooves are formed on the surface of the fluororesin tube of the fixing roller. In such a case, it is effective to increase the electrostatic capacity of the resin layer of the fixing roller by reducing the resistance of the fluororesin primer, and the potential of the surface can be controlled to a low level.

In the fluororesin tube-covered fixing roller, the thickness of the fluororesin tube which is the surface layer of the fixing roller is suitably in the range of 10 to 60 μm. If the thickness of the fluororesin tube is less than 10 μm, the abrasion of the fluororesin tube occurs, thereby rendering its durability insufficient.

On the other hand, if the thickness of the fluororesin tube is more than 60 μm, the resistance to the abrasion is sufficient, and hence its durability is satisfactory. However, because of the thick fluororesin tube, the electrostatic capacity of the resin layer of the fixing roller decreases, and the charge potential on the surface becomes high, so that the effect of preventing the peeling offset decreases.

In the fluororesin tube-covered fixing roller, the electrostatic capacity in the portion nipped by the fixing roller and the pressure roller is suitably in the range of 500 to 1000 pF.

If the electrostatic capacity is 499 pF or less, the charging potential on the surface rises, so that the effect of preventing the peeling offset decreases. If the electrostatic capacity is 1001 or more, the charge for binding the toner applied to the transfer-receiving material in a transfer step on the transfer-receiving paper leak to the resin layer of the fixing roller, so that a toner offset phenomenon is liable to occur.

Next, the present invention will be described more specifically.

EXAMPLE 1

The first embodiment of the present invention will be described below, referring to Table 1.

A peeling offset, a toner offset, an image line failure and workability were evaluated as follows.

1. Ranking of the peeling offset

○: The peeling offset did not occur at all.

Δ: On the second sheet or later in a paper feed test, the peeling offset was slightly observed by the naked eyes.

×: On the second sheet or later in the paper feed test, the peeling offset was observed by the naked eyes.

2. Ranking of the toner offset

○: The toner offset did not occur at all.

3. Ranking of the image line failure

○: The image line failure did not occur at all.

Δ: Minute lines were observed in a peripheral direction of a roller when a paper feed test was carried out for solid black images.

4. Ranking of the workability

○: Air bubbles or the like were not generated at all.

Δ: Air bubbles were partially generated.

×: Air bubbles were generated throughout.

Furthermore, a fixing temperature was 180° C., a fixing speed was 24 sheets of A4-sized transfer-receiving paper per minute, and the outer diameter of a fixing roller was 40 mm.

TABLE 1

(Performance Evaluation of Example 1)

| | Core Cylinder | | | |
|---|---|---|---|---|
| | Groove Formantion Technique | Groove Depth | Groove Pitch | Primer (volume resistance & thickness) |
| Test Example 1 | Lathe kerfing | 2 μm | 100 μm | $1 \times 10^{15}$ Ω/cm² & 8 μm |
| Test Example 2 | Lathe kerfing | 4 μm | 150 μm | $1 \times 10^{15}$ Ω/cm² & 8 μm |
| Test Example 3 | Lathe kerfing | 10 μm | 200 μm | $1 \times 10^{15}$ Ω/cm² & 8 μm |
| Test Example 4 | Lathe kerfing | 15 μm | 250 μm | $1 \times 10^{15}$ Ω/cm² & 8 μm |
| Test Example 5 | Lathe kerfing | 4 μm | 80 μm | $1 \times 10^{15}$ Ω/cm² & 8 μm |
| Test Example 6 | Lathe kerfing | 4 μm | 280 μm | $1 \times 10^{15}$ Ω/cm² & 8 μm |
| Conventional Example | No surface grooves | Rz = 2 μm | | $1 \times 10^{15}$ Ω/cm² & 8 μm |
| Comparative Example 1 | Blast-treated | Rz = 5 μm | | $1 \times 10^{15}$ Ω/cm² & 8 μm |
| Comparative Example 2 | Grid-like grooves | | | $1 \times 10^{15}$ Ω/cm² & 8 μm |

| | Fluororesin Tube | Peeling Offset | Toner Offset | Image Line Failure | Workability |
|---|---|---|---|---|---|
| Test Example 1 | PFA tube, 50 μm | Δ | ○ | ○ | ○ |
| Test Example 2 | PFA tube, 50 μm | ○ | ○ | ○ | ○ |
| Test Example 3 | PFA tube, 50 μm | ○ | ○ | ○ | ○ |
| Test Example 4 | PFA tube, 50 μm | ○ | ○ | Δ | ○ |
| Test Example 5 | PFA tube, 50 μm | — | — | — | Δ |
| Test Example 6 | PFA tube, 50 μm | Δ | ○ | ○ | ○ |
| Conventional Example | PFA tube, 50 μm | x | ○ | ○ | ○ |

TABLE 1-continued

| (Performance Evaluation of Example 1) | | | | | |
|---|---|---|---|---|---|
| Comparative Example 1 | PFA tube, 50 μm | — | — | — | x |
| Comparative Example 2 | PFA tube, 50 μm | — | — | — | x |

Figure 2:
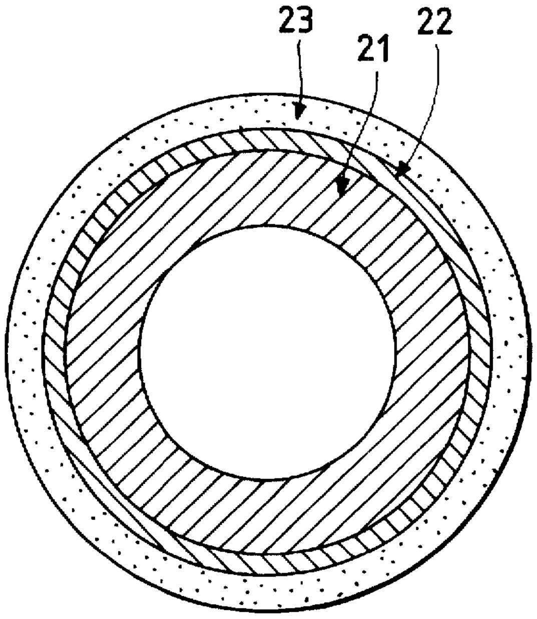
FIG. 2 is a schematic sectional view of a conventional fluororesin tube-covered fixing roller.

A conventional fluororesin tube fixing roller was manufactured, as shown in FIG. 2, by coating a core cylinder 21 having no grooves on its surface with an aqueous coating material mainly consisting of a mixture of fluororesin (a mixture of PTFE, PFA and FEP) and polyamide imide as a primer 22 having a volume resistance of $1\times10^{15}$ $\Omega/cm^2$ so that the thickness of the aqueous coating material might be 8 μm, covering the thus coated core cylinder with a fluororesin tube 23 having a thickness of 50 μm, and then fusing the tube thereonto. As the fluororesin tube, a PFA tube was used. In this case, an average roughness (Rz) (measured according to JIS-B-0601) at ten points on the surface of the core cylinder was 2 μm.

When the conventional fluororesin tube fixing roller was used, peeling charges generated at the time of separating a transfer-receiving material from the fixing roller remained on the surface of the fixing roller, and as a result, a peeling offset occurred.

Figure 3:
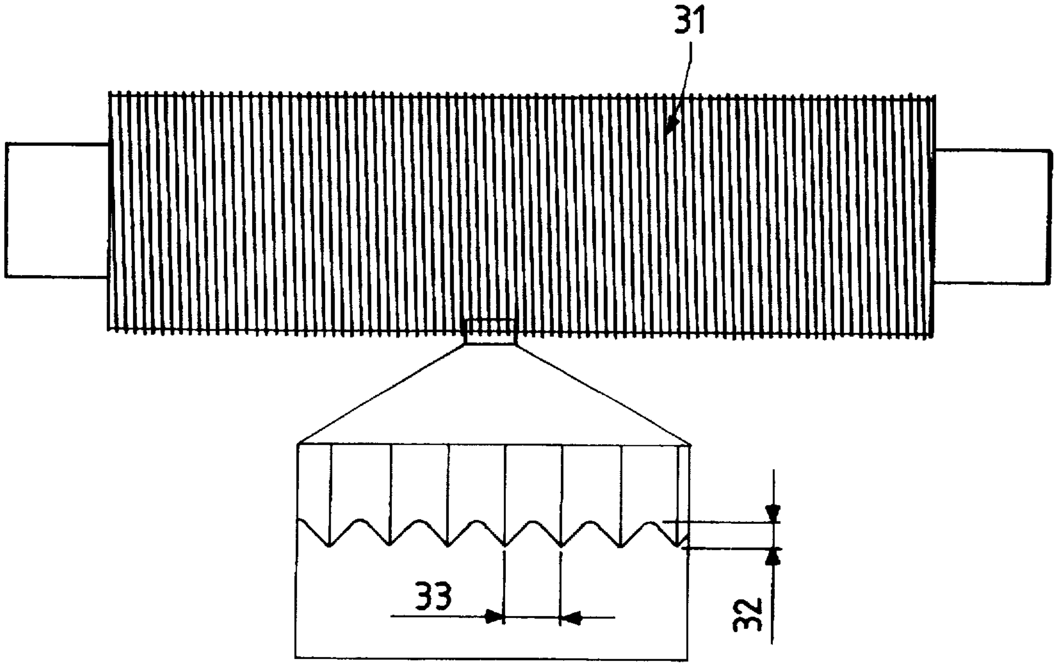
FIG. 3 is a schematic view showing parallel grooves formed on the peripheral surface of a core cylinder of a fluororesin tube-covered fixing roller according to the present invention.

The fluororesin tube fixing rollers described in Test Examples 1 to 6 were manufactured, as shown in FIG. 3, by coating a core cylinder provided with grooves on its surface according to the present invention with a primer having a volume resistance of $1\times10^{15}$ $\Omega/cm^2$ so that the thickness of the primer might be 8 μm, covering the thus coated core cylinder with a PFA tube having a thickness of 50 μm, and then fusing the tube thereon. At that time, the grooves were formed on the peripheral surface of the core cylinder 31 by a lathe so as to possess a predetermined depth 32 and a predetermined pitch 33, as shown in FIG. 3.

When the core cylinder having a groove depth of 4 μm (Test Example 2: pitch=150 μm) and the core cylinder having a groove depth of 10 μm (Test Example 3: pitch=200 μm) were used, the minute grooves came out on the fluororesin surface after the fusing of the PFA tube. By virtue of the effect of the minute grooves on the fluororesin surface, the separation of a transfer material from the fixing roller could be smoothly carried out, so that the amount itself of peeling charges could be controlled to a low level.

According to the fixing rollers of the present invention, the surface area of the fluororesin surface was larger than in the conventional fixing roller, whereby a peeling charge potential could be controlled to a low level. As a result, the tube-covered fixing roller in which any peeling offset did not occur could be obtained.

When the core cylinder having a groove depth of 2 μm (Test Example 1: pitch=100 μm) was used, the minute grooves could not be sufficiently formed on the surface thereof after the fusing of the PFA tube. In consequence, the effect of preventing the peeling offset was less than in Test Examples 2 to 4.

When the core cylinder having a groove depth of 15 μm (Test Example 4: pitch=250 μm) was used, convex lines on its surface after the fusing of the PFA tube were extremely large. Thus, the peeling offset could be prevented, but when sheets having a solid black image were fed, image failures occurred along the convex lines (grooves) on the surface.

From the results of Test Examples 1 to 4, it is apparent that the depth of the grooves formed on the core cylinder is suitably in the range of 3 to 15 μm.

On the other hand, when the core cylinder, on which the grooves having a depth of 4 μm but a pitch of 280 μm were formed, was used (Test Example 6), the effect of preventing the peeling offset was less than in Test Examples 2 to 4. When the pitch of the grooves was 280 μm, the pitch of convex lines on the surface of the fixing roller after the fusing of the PFA tube increased.

In consequence, a contact area between the fixing roller and the transfer material was increased, and it would be supposed that the quantity of peeling charges at a time when they were separated from each other was smaller than in Test Examples 2 to 4.

Furthermore, on the other hand, when the core cylinder, on which the grooves having a depth of 4 μm but a pitch of 80 μm were formed, was used (Test Example 5), a large amount of gas was left in the minute grooves in the fusing of the PFA tube, and this gas was not released outwardly from the tube, so that air bubbles were inconveniently generated between the core cylinder and the tube.

From the results of Test Examples 2, 5 and 6 described above, it is apparent that the pitch of the grooves formed on the core cylinder is suitably in the range of 100 to 280 μm, more suitably 100 to 250 μm.

As other techniques for preventing the peeling offset by the utilization of moderate convex portions which comes out on the surface of the fluororesin tube after its fusing in place of the formation of the continuous and adjacent grooves in the peripheral direction of the core cylinder, a blast treatment of the core cylinder surface or the formation of grid-like grooves can be contrived.

In the case where there was used a fixing roller (Comparison Example 1) which was manufactured by fusing the PFA tube on the blast-treated surface of the core cylinder and in which an average roughness (Rz) at ten points on the surface of the core cylinder was 5 μm, the peeling offset could not be prevented.

In addition, the gas remaining on the blasted surface could not be sufficiently released outwardly from the tube, so that air bubbles were generated between the core cylinder and the tube when fusing the PEA tube. In consequence, this fixing roller was impractical.

Figure 4:
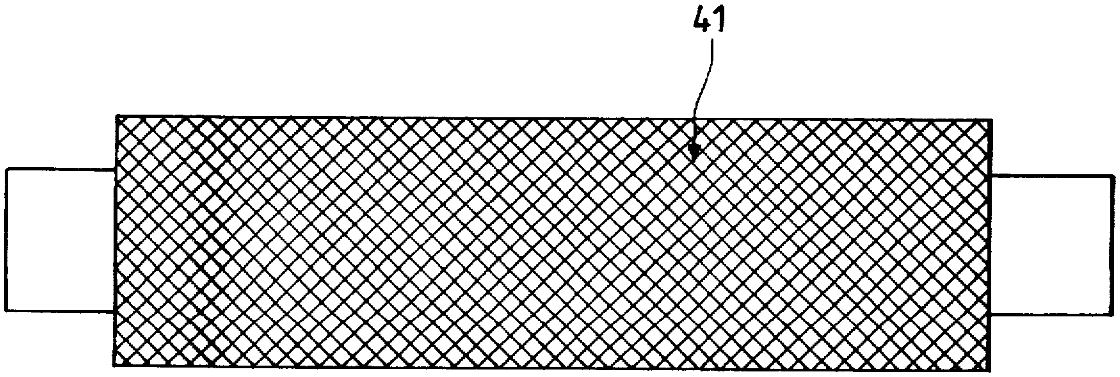
FIG. 4 is a schematic view showing grid-like grooves formed on the core cylinder of the fluororesin tube-covered fixing roller.

When a core cylinder provided with grid-like grooves (pitch=150 μm and depth=4 μm), as shown in FIG. 4, was used (Comparison Example 2), the peeling offset could be considerably prevented, but there was a problem that the air bubbles were generated at the time of fusing the tube, as in the above-mentioned blast-treated core cylinder.

EXAMPLE 2

The second embodiment according to the present invention will be described below, referring to Table 2.

A peeling offset was evaluated as follows.

○: The peeling offset did not occur at all.

Δ: On the second sheet or later in a paper feed test, the peeling offset was slightly observed by the naked eyes.

×: On the second sheet or later in the paper feed test, the peeling offset was observed by the naked eyes.

A fixing temperature was 180° C., and the outer diameter of a fixing roller was 40 mm.

TABLE 2

(Performance Evaluation of Example 2)

| | Core Cylinder | | Primer | |
|---|---|---|---|---|
| | Groove Depth | Groove Pitch | Volume Resistance | Thickness |
| Test Example 2 | 4 μm | 150 μm | $1 \times 10^{15}$ Ω/cm² | 8 μm |
| Test Example 7 | 4 μm | 150 μm | $1 \times 10^{10}$ Ω/cm² | 8 μm |
| Test Example 8 | 4 μm | 150 μm | $1 \times 10^{6}$ Ω/cm² | 8 μm |
| Test Example 9 | 4 μm | 150 μm | $1 \times 10^{3}$ Ω/cm² | 8 μm |
| Comparative Example 3 | No grooves | Rz = 2 μm | $1 \times 10^{3}$ Ω/cm² | 8 μm |

| | Fluororesin Tube | Electrostatic Capacity (pF) | Peeling Offset (8-sheet apparatus) | Peeling Offset (24-sheet apparatus) |
|---|---|---|---|---|
| Test Example 2 | PFA tube, 50 μm | 650 | ○ | Δ |
| Test Example 7 | PFA tube, 50 μm | 700 | ○ | ○ |
| Test Example 8 | PFA tube, 50 μm | 730 | ○ | ○ |
| Test Example 9 | PFA tube, 50 μm | 760 | ○ | ○ |
| Comparative Example 3 | PFA tube, 50 μm | 760 | Δ | x |

In Test Example 2, a core cylinder on which grooves having a deep of 4 μm and a pitch of 150 μm were formed was coated with a fluororesin primer having a volume resistance of $1\times10^{15}$ Ω/cm² so that the thickness of the fluororesin primer might be 8 μm, and the thus coated core cylinder was then covered with a PFA tube, followed by fusing the tube. As described in Example 1, by the use of such a fluororesin tube-covered roller as in Test Example 2, the quantity of peeling charges at the separation of a transfer material from the fixing roller could be reduced, and a peeling offset could be prevented.

However, when this fixing roller was used in a high speed image formation apparatus (for example, 24 sheets of A4-sized paper per minute), the separation of the transfer material from the fixing roller frequently occurred, so that peeling charge could not be completely inhibited, even if the fixing roller in Test Example 2 was used. As a result, the peeling offset took place.

In such a case, as a technique for controlling the generated peeling charge potential to a low level, it can be contrived that the primer is rendered conductive. As a result of rendering the primer conductive, the electrostatic capacity of the resin layer of the fixing roller can be increased to control the charge potential to a low level.

In Test Examples 7 to 9, there was inspected a relation between the electrostatic capacity of the fixing roller and the peeling offset in the case where the primer used in Example 1 was rendered conductive. Here, rendering the primer conductive can usually be accomplished by a technique of dispersing a conductive powder of carbon, a metallic oxide or the like in the primer. In this example, a technique of dispersing ketjen black as carbon black in the fluororesin primer was used.

The electrostatic capacity of the fixing roller referred to herein means an electrostatic capacity of the resin layer of the fixing roller in a portion nipped by the fixing roller and the pressure roller, and it can be obtained by the following equation.

$$C=C_1 \cdot C_2/(C_2-C_1)$$

C: An electrostatic capacity of the resin layer (the fluororesin tube+the primer) of the fixing roller in the nipped portion.

$C_1$: A total electrostatic capacity of the fixing roller and the pressure roller in the nipped portion.

$C_2$: An electrostatic capacity of a pressure roller rubber layer in the nipped portion.

The above-mentioned measurement was carried out provided that the diameter of the fixing roller was 40 mm, the length of the fixing roller was 325 mm, and the width of the nipped portion between the fixing roller and the pressure roller was 2 mm.

As in Test Example 7, when a fluororesin primer having a volume resistance of $1\times10^{10}$ Ω/cm² was used, the electrostatic capacity of the fixing roller was 700 pF. That is to say, since the volume resistance of the primer was low, the electrostatic capacity was larger than the fixing roller in Test Example 2. As a result, a potential generated by peeling charges could be controlled to a low level, and also in a high speed image formation apparatus, the peeling offset could be prevented.

Similarly, in Test Example 8, a fluororesin primer having a volume resistance of $1\times10^{6}$ Ω/cm² was used, and in this case, the electrostatic capacity of the fixing roller was 730 pF. In Test Example 9, a fluororesin primer having a volume resistance of $1\times10^{3}$ Ω/cm² was used, and in this case, the electrostatic capacity of the fixing roller was 760 pF. These electrostatic capacities were larger than in Test Example 2. As a result, the peeling offset could also be prevented in a high speed image formation apparatus.

On the other hand, in Comparison Example 3, a fluororesin-covered fixing roller was used which was manufactured by coating a core cylinder having no grooves on its surface with a primer having a volume resistance of $1\times10^{3}$ Ω/cm² so that the thickness of the primer might be 8 μm, covering the thus coated core cylinder with a PFA tube having a thickness of 50 μm, and then fusing the tube. In this case, although the volume resistance of the primer was low and the electrostatic capacity of the fixing roller was 760 pF as in Test Example 9, peeling charges generated at the time of separating a transfer-receiving material from the fixing roller were left on the surface of the fixing roller, and as a result, the peeling offset occurred.

EXAMPLE 3

The third embodiment of the present invention will be described below, referring to Table 3.

A peeling offset and durability were evaluated as follows:

1. Ranking of the peeling offset

○: The peeling offset did not occur at all.

Δ: On the second sheet or later in a paper feed test, the peeling offset was slightly observed by the naked eyes.

2. Ranking of the durability

○: After feeding 200,000 sheets, failures such as an offset and the peeling offset did not occur.

Δ: After feeding 200,000 sheets, the offset due to abrasion of a surface layer occurred. A fixing temperature was 180° C., and the outer diameter of a fixing roller was 40 mm.

TABLE 3

(Performance Evaluation of Example 3)

| | Core Cylinder | | Primer | |
|---|---|---|---|---|
| | Groove Depth | Groove Pitch | Volume Resistance | Thickness |
| Test Example 10 | 4 μm | 150 μm | $1 \times 10^{15}$ Ω/cm² | 8 μm |
| Test Example 2 | 4 μm | 150 μm | $1 \times 10^{15}$ Ω/cm² | 8 μm |
| Test Example 11 | 4 μm | 150 μm | $1 \times 10^{15}$ Ω/cm² | 8 μm |

| | Fluororesin Tube | | Electro-static Capacity | Peeling Offset (8-sheet | Dura- |
|---|---|---|---|---|---|
| | Tube | Thickness | (pF) | apparatus) | bility |
| Test Example 10 | PFA tube | 70 μm | 620 | Δ | ○ |
| Test Example 2 | PFA tube | 50 μm | 650 | ○ | ○ |
| Test Example 11 | PFA tube | 10 μm | 850 | ○ | Δ |

In Test Example 2, a fixing roller was manufactured by coating a core cylinder having grooves of 4 μm in depth and a 150 μm in pitch formed on its surface with a fluororesin primer having a volume resistance of $1\times10^{15}$ $^{Ω/cm2}$ so that the thickness of the fluororesin primer might be 8 μm, covering the thus coated core cylinder with a PFA tube having a thickness of 50 μm, and then fusing the tube. As described in Example 1, when a fluororesin tube-covered roller in Test Example 2 was used, the quantity of peeling charges generated at the time of separating of a transfer material from the fixing roller could be reduced to prevent the peeling offset.

In Test Example 10, the same core cylinder as in Test Example 2 was coated with the same primer as in Test Example 2, covered with a PFA tube having a thickness of 70 μm, and then fusing the tube to manufacture a fixing roller. At this time, the electrostatic capacity of the fixing roller was measured in the same manner as in Example 2, and as a result, it was 620 pF. This fixing roller in Test Example 10 was installed on an apparatus (8 sheets of A4-sized paper per minute), and the obtained image was evaluated. In consequence, a peeling offset slightly occurred. It may be presumed that the electrostatic capacity of the fixing roller in Test Example 10 was small, and hence the surface potential of the fixing roller generated by peeling charges could not be reduced, so that the peeling offset slightly occurred.

On the other hand, in Test Example 11, the same core cylinder as in Test Example 2 was coated with the same primer as in Test Example 2, covered with a PFA tube having a thickness of 10 μm, and then fusing the tube to manufacture a fixing roller. At this time, the electrostatic capacity of the fixing roller was 850 pF. This fixing roller in Test Example 11 was mounted on an apparatus (8 sheets of A4-sized paper per minute), and the obtained image was evaluated. In consequence, the generation of a peeling offset was not observed, but when 5000 sheets of A4-sized recording paper were fed, the abrasion of a surface resin layer was serious, so that a toner offset phenomenon occurred.

From the results of the aforementioned tests, it is apparent that the thickness of the surface fluororesin tube is suitably in the range of 10 to 60 μm.

What is claimed is:

1. A fixing roller for thermally fixing an unfixed toner image, which is covered with a fluororesin tube, wherein a core cylinder of the fixing roller is provided on its periphery with a minute groove means for imparting to the surface of the fluororesin tube concavities or convexities extending in parallel in the peripheral direction of the fixing roller.

2. The fixing roller according to claim 1, wherein the minute groove means is comprised of a large number of circular minute grooves arranged in parallel in the peripheral direction of the core cylinder.

3. The fixing roller according to claim 1, wherein the minute groove means is in the form of a minute groove spirally wound closely around the core cylinder periphery.

4. The fixing roller according to claim 2 or 3, wherein a depth of the grooves extending in parallel in the peripheral direction of the core cylinder is in the range of 3 to 15 μm.

5. The fixing roller according to claim 2 or 3, wherein the pitch of the grooves extending in parallel in the peripheral direction of the core cylinder is in the range of 81 to 250 μm.

6. The fixing roller according to claim 2 or 3, wherein a volume resistance of a primer layer for bonding the fluororesin tube to the core cylinder is in the range of $1\times10^3$ to $1\times10^{10}$ Ω/cm².

7. The fixing roller according to claim 4, wherein a thickness of the fluororesin tube is in the range of 10 to 60 μm.

8. The fixing roller according to claim 1, wherein an electrostatic capacity of the fixing roller is in the range of 500 to 1000 pF.

9. An image fixing apparatus for holding and carrying a recording medium having an unfixed toner image by a fixing roller for thermally fixing the unfixed toner image the fixing roller being covered with a fluororesin tube, and a pressure member, wherein a core cylinder of the fixing roller is provided on its periphery with a minute groove means for imparting to the surface of the fluororesin tube concavities or convexities extending in parallel in the peripheral direction of the fixing roller.

10. The image fixing apparatus according to claim 9, wherein the minute groove means is comprised of a large number of circular minute grooves arranged in parallel in the peripheral direction of the core cylinder.

11. The image fixing apparatus according to claim 9, wherein the minute groove means is in the form of a minute groove spirally wound closely around the core cylinder periphery.

12. The image fixing apparatus according to claim 10 or 11, wherein a depth and a pitch of the grooves extending in the peripheral direction of the core cylinder is in the range of 3 to 15 μm and in the range of 100 to 250 μm, respectively.

13. The image fixing apparatus according to claim 12, wherein a volume resistance of a primer layer for bonding the fluororesin tube to the core cylinder is in the range of $1\times10^3$ to $1\times10^{10}$ Ω/cm².

* * * * *

UNITED STATES PATENT AND TRADEMARK OFFICE

CERTIFICATE OF CORRECTION

PATENT NO. : 5,753,348

DATED : May 19, 1998

INVENTOR(S) : Hideyuki HATAKEYAMA, et al.

It is certified that error appears in the above-identified patent and that said Letters Patent is hereby corrected as shown below:

COLUMN 1:

Line 5, "1. Filed" should read --1. Field--.
Line 52, "the" (second occurrence) should be deleted.

COLUMN 2:

Line 38, "defective" should read --defects--.

COLUMN 9:

Line 28, "deep" should read --depth-- and "formed" should read --formed,--.

COLUMN 11:

Line 24, "$1x10^{15\ \Omega/cm2}$" should read --$1x10^{15}\ \Omega/cm^2$--.

UNITED STATES PATENT AND TRADEMARK OFFICE

CERTIFICATE OF CORRECTION

PATENT NO. : 5,753,348

DATED : May 19, 1998

INVENTOR(S) : Hideyuki HATAKEYAMA, et al.

It is certified that error appears in the above-identified patent and that said Letters Patent is hereby corrected as shown below:

COLUMN 12:

Line 35, "image" should read --image,--.

Signed and Sealed this

First Day of December, 1998

Attest:

BRUCE LEHMAN

*Attesting Officer* *Commissioner of Patents and Trademarks*